July 11, 1972   K. N. WHITE ET AL   3,676,272

HAND TOOL FOR APPLYING EDGE BANDING TO LAMINATED PLASTIC BOARDS

Filed May 8, 1970                                   2 Sheets-Sheet 1

INVENTORS
KENNETH N. WHITE
HAROLD E. MEYER
BY
Alter, Weiss and Whitesel
ATTORNEYS

United States Patent Office 3,676,272
Patented July 11, 1972

3,676,272
HAND TOOL FOR APPLYING EDGE BANDING TO LAMINATED PLASTIC BOARDS
Kenneth N. White and Harold E. Meyer, both c/o White-Meyer Wood Products, Inc., 141st and Rte. 45, Orland Park, Ill. 60462
Filed May 8, 1970, Ser. No. 35,714
Int. Cl. B32b 31/10, 31/20
U.S. Cl. 156—574                                  8 Claims

ABSTRACT OF THE DISCLOSURE

A hand tool comprises two space parallel plates floating relative to each other, on a pair of bias springs. The plates fit over the edges of a laminated plastic board. A guide wall positioned between these plates applies a pressure on a strip of edge banding plastic, forcing it against the edges of the laminated board, having an adhesive previously applied thereto. The length of the parallel plates is adequate to insure an alignment of the edge banding strip and the laminated board before there is a tack between the edge banding strip and the board.

---

Figure 1:
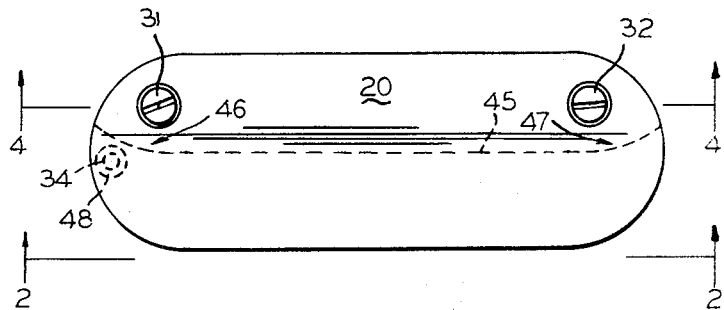

This invention relates to hand tools and more specifically to an alignment hand tool for applying a self-edge banding to laminated plastic covered boards.

Laminated plastic covered boards of the described type, are generally used for such things as kitchen counters, table tops, and the like. For convenience of expression, these boards are hereinafter called "tops," but the invention is not limited to table or counter tops, per se. Usually, these plastic tops are made by cementing large sheets of a hard, wear resistant plastic over a core material, such as three-quarter inch plywood. The resulting structure is a strong and handsome, scuff and wear resistant material. With modern adhesives, these plastic top sheets are fairly easy to attach to the core. Usually, it is done in a factory.

The edges of these plastic top sheets is a different matter. Usually, they are covered by an edge banding of the top material to form a so called "self-edge." Conventionally these edges are sometimes formed by sawing a narrow strip of a board covered with the plastic. A good alignment between the edge and top is assured. Then, it is necessary to fit two wooden boards together with a cabinetmaker's precision.

Another method of applying an edge banding to laminated plastic tops is to trim the plastic covered top to a desired form and shape. Then, a strip of plastic is cemented along the exposed cut edge of the top. However, this method presents some problems because the strip sometimes slips out of alignment while it is being attached to the top. Since the adhesive sets up quickly with an almost immediate tack, this method requires the plastic strip to be in a nearly perfect alignment at the instant when the edge banding comes into contact with the cut edge of the top. Thus, if this method is used, there must be an almost foolproof method of making the strip and top alignment, ab initio, before the first tack occurs.

It is not too difficult to accomplish this alignment in a factory with production quality precision tooling. However, this type of tooling requires a high initial cost for entry into the plastic lamination manufacturing business. Also, it is not easy to adapt such tooling to use in the field. Hence, this factory type tooling does not facilitate the construction of a laminated top board in the field.

A very convenient edge banding hand tool, of the described type, is easy to carry about and use in the field, while installing an edge banding on a laminated board. For example, a built in counter top might be a free form which is most conveniently cut and fitted in the field. After it is trimmed to size and custom fitted into the available space, an adhesive is painted on the cut and raw edge of the counter top. Next, an edge banding strip of the appropriate plastic is placed near the adhesive. The hand tool is fitted over the edge banding, and the counter top to make a nearly perfect alignment between the strip with the counter top. Then, the hand tool is slid along the edge of the counter top while a horizontal pressure is applied to push the edge banding firmly into its final cemented position.

Accordingly, an object of the invention is to provide new and improved hand tools for applying edge banding to the exposed edge of a laminated plastic board. Here an object is to provide a small tool which is easy to carry about and use. In this connection, an object is to provide an edge banding tool which may be used on plastic tops with virtually any free form. Stated another way, an object is to provide a tool which is not limited to edge banding along a straight line.

Another object is to provide low cost tooling which does not require any real investment capital. Here, an object is to provide adjustable tooling which fits across the edge of almost any laminated top despite a great variety of different board thicknesses. A further object is to make the hand tool from material which would otherwise be useless scrap.

Yet another object of the invention is to provide a new and novel method of applying a self-edge banding to a laminated plastic top.

Figures 2, 3:
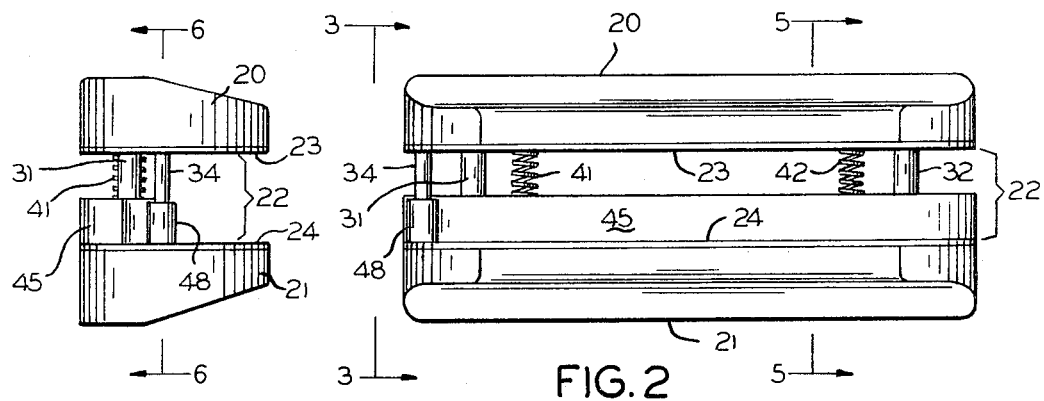
Figures 4, 5:
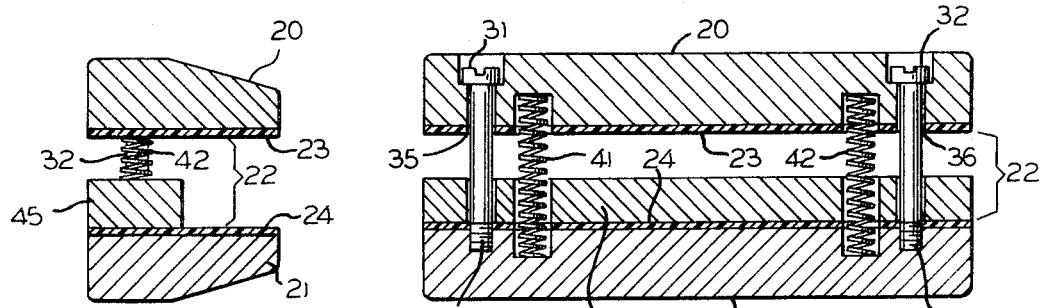
Figure 6:
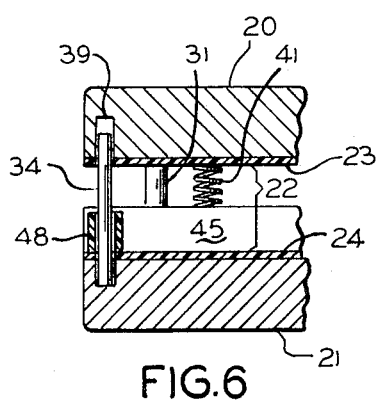
Figure 7:
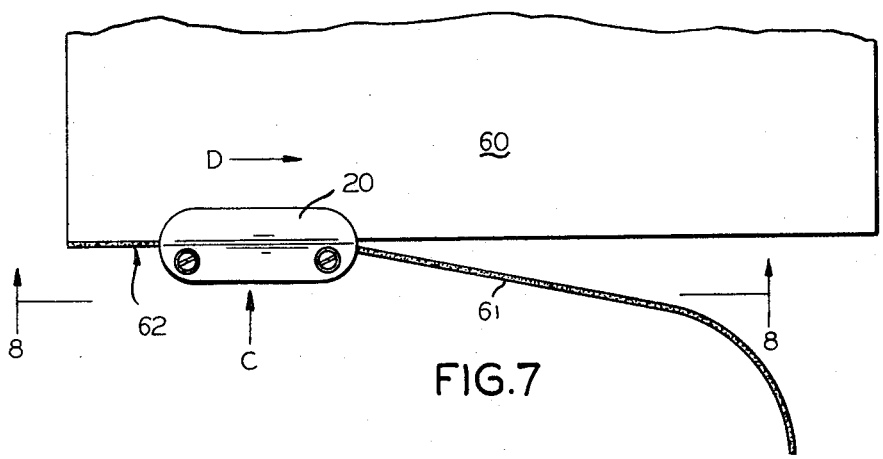
Figure 8:
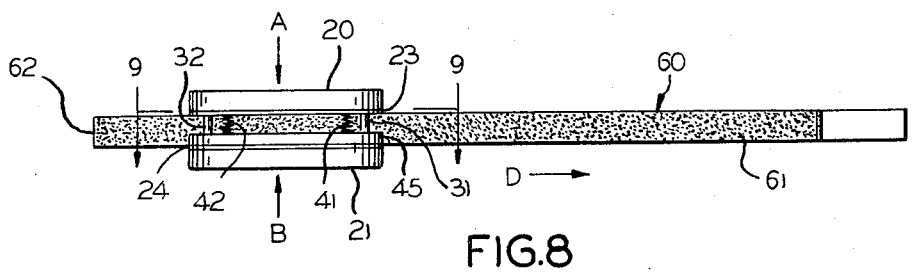
Figure 9:
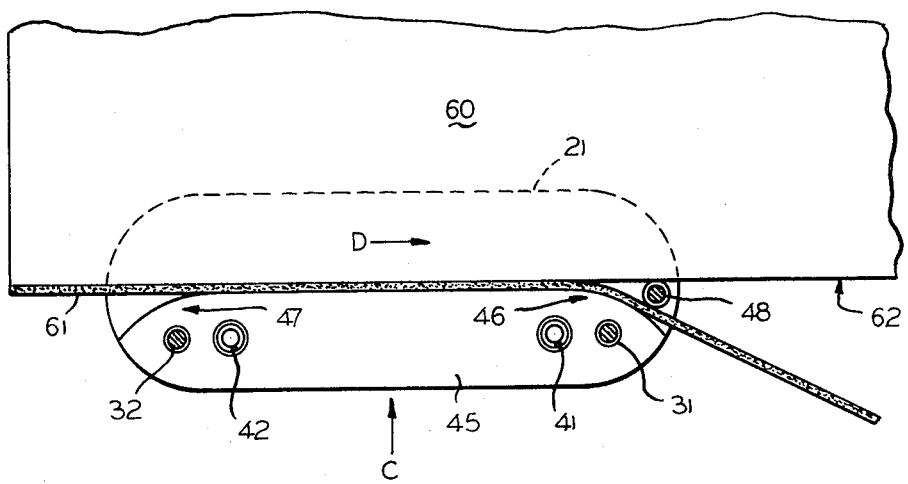

In keeping with an aspect of the invention, these and other objects of the invention are accomplished by a preferred embodiment, as shown in the attached drawing, in which:

FIG. 1 is a top plan view of the hand tool;
FIG. 2 is a front elevation view taken along line 2—2 of FIG. 1;
FIG. 3 is an end elevation view taken along line 3—3 of FIG. 2;
FIG. 4 is a cross sectional longitudinal view taken along line 4—4 of FIG. 1;
FIG. 5 is a cross sectional transverse view taken along line 5—5 of FIG. 2;
FIG. 6 is a fragmentary cross sectional view taken along line 6—6 of FIG. 3;
FIG. 7 is a top view showing the hand tool being used to apply edge banding to a plastic top;
FIG. 8 is a front view taken along line 8—8 of FIG. 7, showing the hand tool being used to apply an edge banding; and
FIG. 9 is an enlarged view taken along line 9—9 of FIG. 8, with the top plate removed from the hand tool to show how an edge banding strip feeds through it.

The description which follows refers to the drawings interchangably. The same reference characters identify the same parts in all figures.

The inventive tool comprises upper and lower spaced parallel plates or panels 20, 21 forming jaws of an opening 22. While these plates may be made from any suitable material, we prefer to use laminated plastic boards of the same general type as that to which the edge banding is applied. The primary reason for using this laminated board is that it has a plastic 23, 24 material lining the opposing sides of the jaws 22 formed by the spaced boards 20, 21. The characteristics of plastic 23, 24 are equal in all respects to the characteristics of the laminated plastic covering the top and the plastic edge banding. Hence, the plastic 22 is not hard enough to scratch, or otherwise mark, the laminated plastic of the top. Yet, the smooth hard surfaces of the jaws 23, 24 slip easily over the surfaces of the laminated top.

The outer contours of the plates 20, 21 are rounded and smooth to prevent an uncomfortable grip in the hands of the user.

Two bolts 31, 32 hold the plates 20, 21 together in relatively rigid lateral positions wherein they do not have freedom of movement in any direction except toward and away from each other. At least one guide pin 34 is provided for helping to stabilize the relative positions of the two plates 20, 21 with respect to each other.

The bolts 31, 32, pass loosely through holes 35, 36 in plate 20. At 37, 38, they turn tightly into nut-like threaded holes in a plate 21. The stabilizing pin 34 is able to slide in a hole 39, as the plates 20, 21 move toward and away from each other. Two springs 41, 42 bias the jaws of the plates 20, 21 to as wide an open position as the bolts 31, 32 permits. Hence, it is seen that the plates are floatingly held apart with a spring biased force. Nevertheless, the plates 20, 21 may be squeezed together to fit snuggly over the edge of the top.

Preferably, the bias of the springs, the degree of freedom allowed, etc. are selected according to the strength of a workers hands. The plates 20, 21 should float freely in their open position, as indicated at 22. Nevertheless, the jaws should squeeze together without unduly tiring the normal worker.

The lower plate 21 has a guide wall 45 firmly attached thereto in any suitable manner, as by cementing, nailing or the like. This guide wall presses against the edge banding when the worker pushes the tool firmly against the edge of the table. This pushes the edge banding plastic strip against the adhesive cement. The leading and trailing edges of the guide wall are gently curved, as at 46, 47 to guide the edge banding against the top without marring it.

To further guide the edge banding strip into intimate contact with the top, a roller 48 is mounted on the guide pin 34. This roller helps guide the edge banding as it moves toward the edge of the top.

The operation of the invention should now be clear. First an adhesive is painted on the edge of the top 60 (FIG. 7-9). Thereafter, the edge banding strip 61 is placed vertically within the jaws 22, between end 46 and roller 48. The lengths of the plates 20, 21 are adequate to insure a longitudinal alignment of the strip 61 within the jaws 22.

Next, the jaws 22 are slipped over the edge 62 of the top 60 and squeezed together, as indicated by the arrows A, B. By necessity, the strip 61 and top 60 must now be in a nearly perfect alignment with each other along the entire length of the plates 20, 21. Given an adequate length for the plates 20, 21 and a sufficient rigidity for the edge banding strip 61, the top 60 and strip 61 must now be almost perfectly aligned with each other around the entire perimeter of the top. Then, the hand tool is pushed in direction C in toward the table, so that guide wall 45 rests firmly against the edge 62 of the top 60. This pressure C pushes the edge banding strip 61 against the edge 62 of the top 60. The tack of the adhesive holds the two together.

Finally, the hand tool is slid in direction D around the perimeter of the top 50 while maintaining the horizontal pressure C against the top 60. The guide wall 45 is of a reduced height, as compared with the width of the jaws 22. This places a concentrated pressure against the lower edge of the edge banding plastic strip 61. Therefore, it may be well to thereafter invert the hand tool so that the guide wall 45 rests against the upper edge of the edge banding 61. Then, the hand tool is again slide around the perimeter of the top to cement the upper edge of the banding. The process may be repeated, as required, until the edge banding is secured in place.

The foregoing describes one exemplary embodiment of the invention. However, other modifications will suggest themselves to those who are skilled in the art. Therefore, the appended claims are to be construed broadly enough to cover all equivalents falling within the true scope and spirit of the invention.

We claim:

1. A hand tool comprising a pair of spaced parallel plates, said plates being spaced from each other by a distance which receives the edge of a board having laminated plastic attached thereto, said plates being floatingly attached to each other with restricted degrees of freedom to move, said floating attachment being such that the two plates always remain in parallel planes, the ends and sides of the two plates remain in alignment with one another, and, while said plates are so parallel and aligned, they may move toward and away from one another by only an allowed distance, means for normally biasing said plates to move the maximum allowable distance from each other, and a guide wall on at least one of said plates shaped to guide an edge banding plastic strip with a banding force against the edge of a laminated plastic board, said plates being long enough to align the edge banding strip and board before an adhesive tack occurs between the strip and board.

2. The hand tool of claim 1, wherein said plates are flat rigid plates having said laminated plastic attached to the flat surfaces thereof with the plastic facing inwardly toward the center of the jaws formed by said plates, the plastic attached to said flat surface being substantially the same material as the edge banding.

3. The hand tool of claim 2, wherein the outside contours of said tool are rounded and smooth.

4. The hand tool of claim 3 and means comprising at least one bolt for accomplishing said restricted movement, said floating attachment bias means comprising at least one bias spring for urging said plates apart as far as said bolt permits.

5. The hand tool of claim 4, wherein said freedom restriction is accomplished by two bolts and an alignment pin.

6. The hand tool of claim 5 and a roller on said alignment pin for guiding said edge banding strip.

7. The hand tool of claim 6, wherein said guide wall has rounded ends to guide the edge banding strip without marring it.

8. The hand tool of claim 1, wherein said guide wall is shaped to bring said edge banding strip into intimate contact with the edge of the plastic board without marring the strip.

References Cited

UNITED STATES PATENTS

| | | | |
|---|---|---|---|
| 2,916,079 | 12/1959 | Schiefer | 156—391 |
| 3,172,798 | 3/1965 | Rosenbaum | 156—583 X |
| 3,132,783 | 5/1964 | Duncan | 225—25 |
| 1,654,024 | 12/1927 | Turner | 156—348 |
| 2,713,437 | 7/1955 | Broden | 156—486 X |
| 3,468,741 | 9/1969 | Miller et al. | 156—486 X |
| 3,280,663 | 10/1966 | Ames | 156—348 X |

BENJAMIN A. BORCHELT, Primary Examiner

J. M. HANLEY, Assistant Examiner

U.S. Cl. X.R.

156—486, 579